Sept. 8, 1970  E. S. GANDRUD  3,527,109
ROTARY DRIVE MECHANISM FOR AGRICULTURAL IMPLEMENTS
Filed Jan. 2, 1969  4 Sheets-Sheet 1

INVENTOR.
EBENHARD S. GANDRUD
BY
Merchant & Gould
ATTORNEYS

Sept. 8, 1970 E. S. GANDRUD 3,527,109
ROTARY DRIVE MECHANISM FOR AGRICULTURAL IMPLEMENTS
Filed Jan. 2, 1969 4 Sheets-Sheet 2

INVENTOR.
EBENHARD S. GANDRUD
BY
Merchant & Gould
ATTORNEYS

INVENTOR.
EBENHARD S. GANDRUD
BY
Merchant & Gould
ATTORNEYS

INVENTOR.
EBENHARD S. GANDRUD
BY
Merchant & Gould
ATTORNEYS

United States Patent Office 3,527,109
Patented Sept. 8, 1970

3,527,109
ROTARY DRIVE MECHANISM FOR
AGRICULTURAL IMPLEMENTS
Ebenhard S. Gandrud, P.O. Box 528,
Owatonna, Minn. 55060
Filed Jan. 2, 1969, Ser. No. 788,462
Int. Cl. F16h *37/00*
U.S. Cl. 74—13       12 Claims

ABSTRACT OF THE DISCLOSURE

Rotary drive mechanism for power operated implements mounted on a prime mover, including a ground-engaging drive wheel operatively connected to implements to be driven, and means for selectively moving the drive wheel into and out of driving engagement with the ground. A resilient lost motion connection maintains the drive wheel in driving engagement with the ground when the mechanism traverses rough or uneven terrain.

---

An important object of this invention is the provision of drive means for tractor mounted implements having rotary or otherwise movable parts to be driven when in use, and of means for rendering the drive means operative or inoperative.

Another object of this invention is the provision of drive means, including a ground-engaging drive wheel, for imparting feed rotation to one or more feeding rotors of granular chemical dispensers generally of the type disclosed in my prior United States Letters Patent Nos. 2,350,107, 2,852,166 and 2,990,186.

Another object of this invention is the provision of means for mounting the drive mechanism to prime movers, such as tractors, of various makes of manufacture.

Yet another object of this invention is the provision of drive mechanism as set forth, having drive wheel lifting and lowering means including a resilient lost motion connection for maintaining the drive wheel in operative engagement with the ground during travel over uneven ground surfaces.

To the above ends, I provide frame structure mounted on a conventional tool bar having means for mounting the same on a tractor, the frame structure including a frame member projecting angularly forwardly and downwardly relative to the tool bar. The drive wheel is journaled on a rearwardly and downwardly sloping leg pivotally connected at its front end to the front end of said frame member, the drive wheel being positioned in trailing relationship to said pivoted front end of the leg. The frame structure journals an implement driving shaft that is connected to the drive wheel by a chain and sprocket wheel system. A lever, mounted on the frame structure, is operatively connected to the leg by a lifting rod pivotally connected at one end to the rear end of the leg, and a resilient lost motion connection between the lifting rod and lever. The lost motion connection yieldingly urges the drive wheel into driving engagement with the ground, and permits limited generally vertical movements of the drive wheel independently of the lever, so that the drive wheel is enabled to follow irregularities in the ground surface.

DETAILED DESCRIPTION

Figure 2:
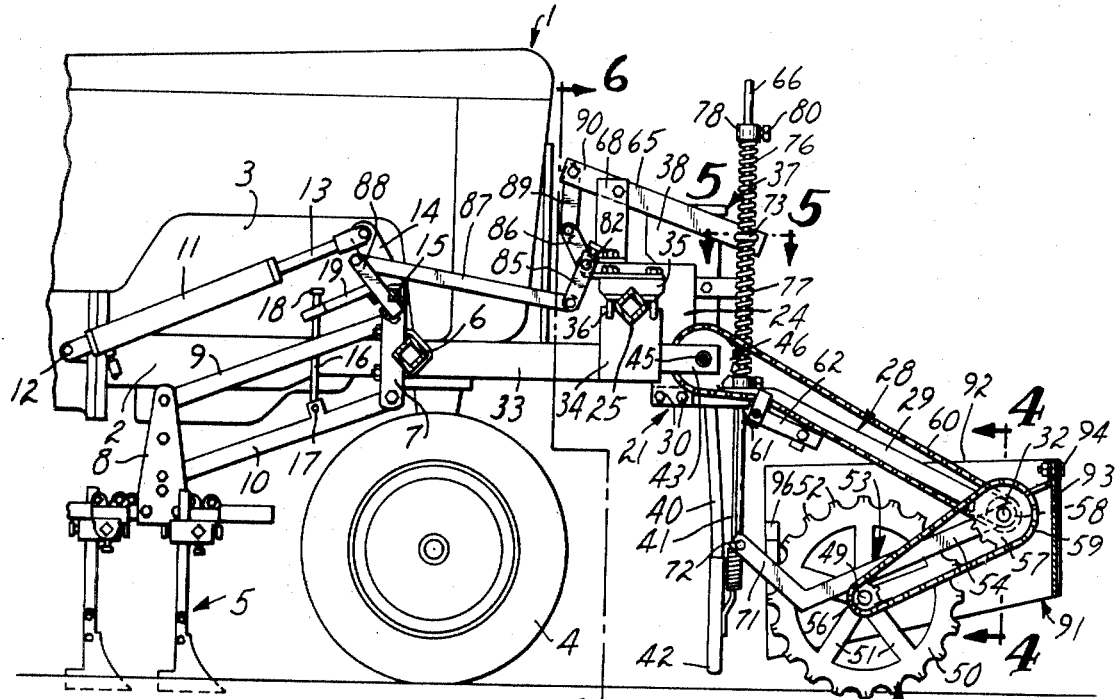
FIG. 2 is a view partly in side elevation and partly in section, taken substantially on the line 2—2 of FIG. 1.
Figure 1:
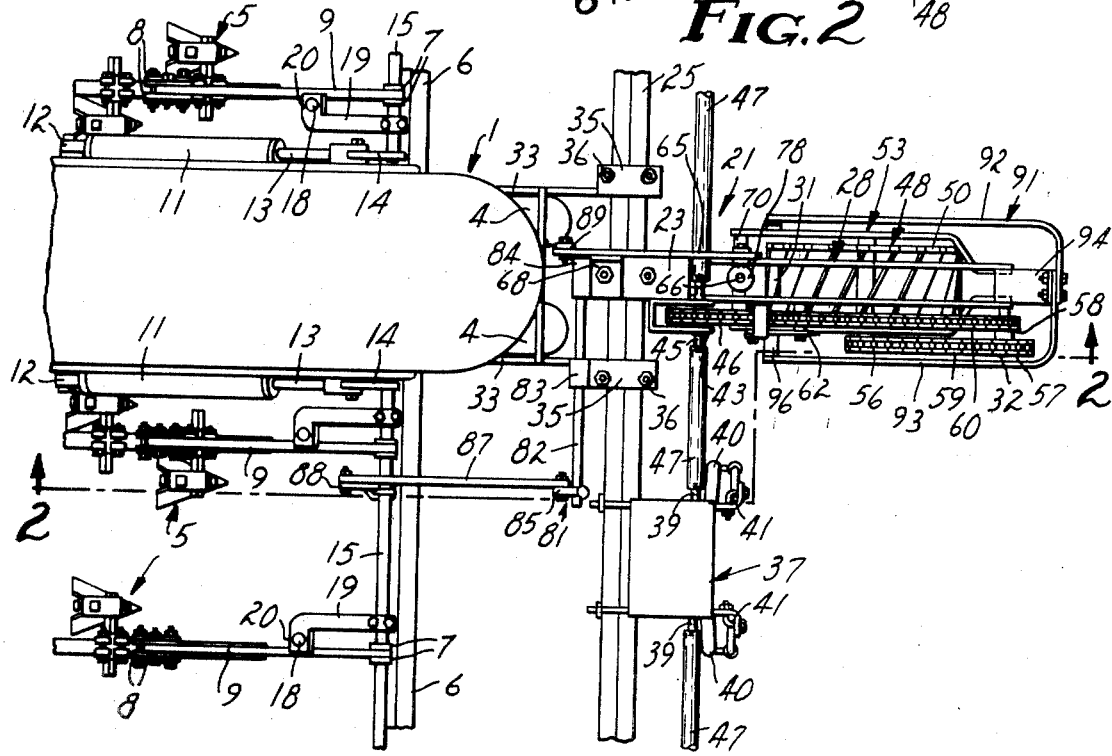
FIG. 1 is a fragmentary view in top plan of the front end portion of a tractor and the rotary drive mechanism of this invention mounted thereon.
Figure 3:
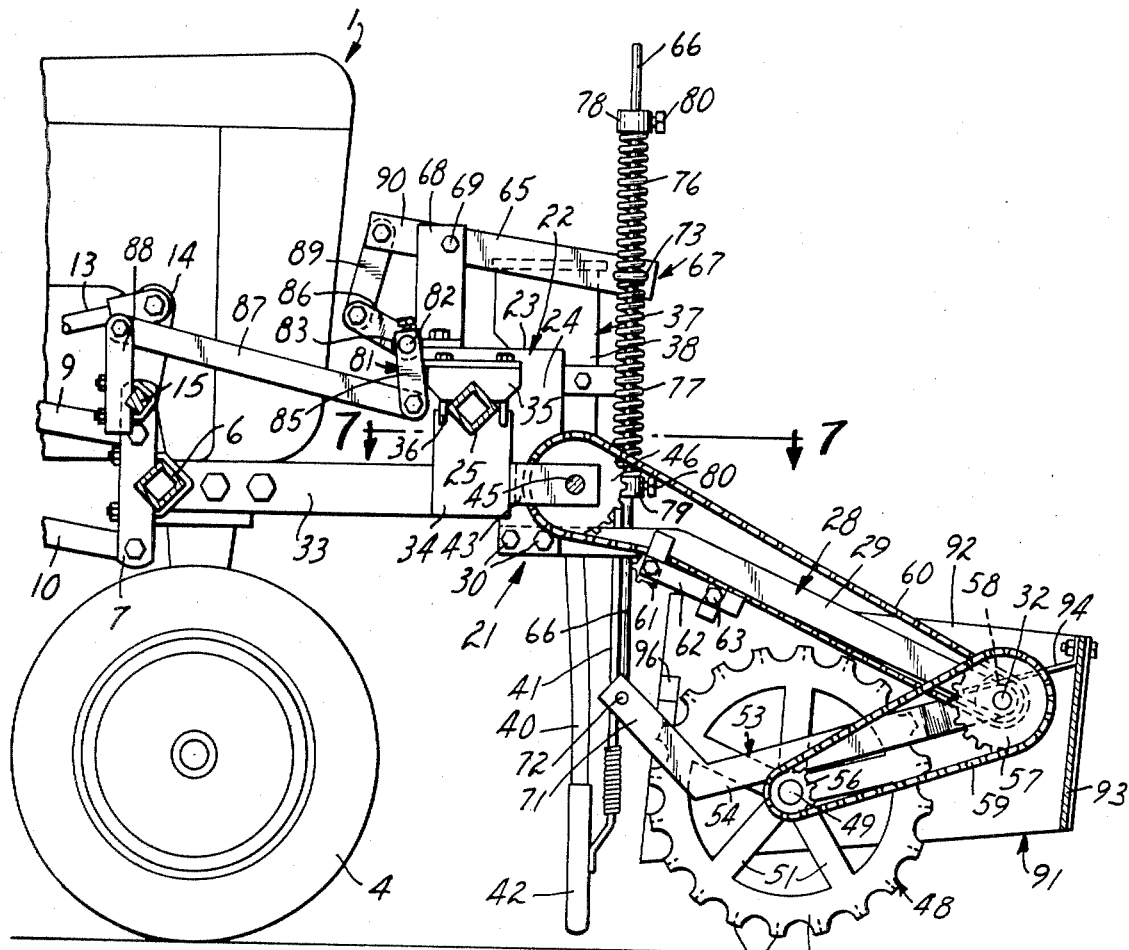
FIG. 3 is an enlarged fragmentary view corresponding to a portion of FIG. 2, but showing a different position of some of the parts.
Figure 4:
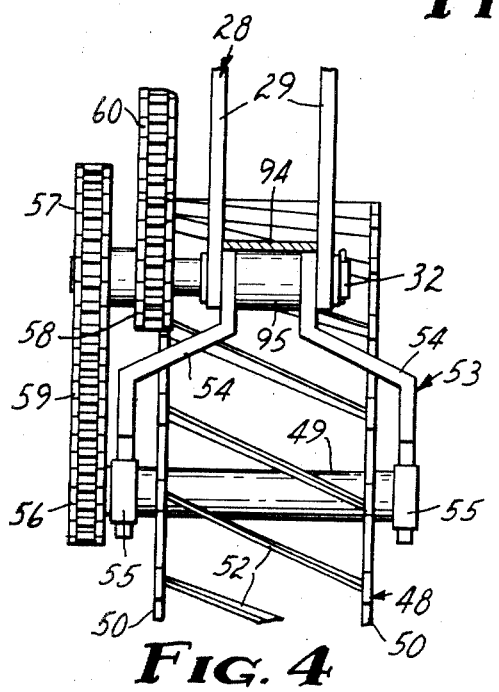
FIG. 4 is an enlarged fragmentary section taken substantially on the line 4—4 of FIG. 2.
Figure 5:
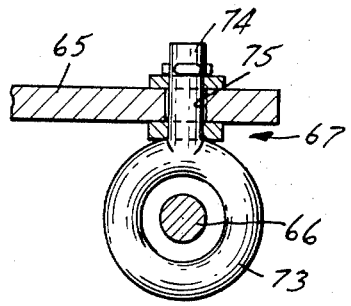
FIG. 5 is a fragmentary horizontal section taken substantially on the line 5—5 of FIG. 2.

The front end portion of a prime mover, in the nature of a conventional tractor 1, is shown in FIGS. 1–3 as including a frame 2, and engine 3, and one or more front wheels 4. The tractor 1 is shown as supporting a plurality of laterally spaced agricultural implements such as cultivator assemblies, indicated generally at 5, by means of an elongated cross sectionally rectangular tool bar 6 that is suitably mounted on the tractor frame 2, and which extends transversely on the path of movement of the tractor 1. The cultivator assemblies 5 are each supported from the tool bar 6 by mounting members 7 and 8 rigidly secured to the tool bar 6 and cultivator assemblies 5 respectively, and parallel links 9 and 10 pivotally connected at their opposite ends to the mounting members 7 and 8, see particularly FIG. 2. A pair of fluid pressure operative cylinders 11 are connected at one end to opposite sides of a tractor frame 2, as indicated at 12, and are equipped with piston rods 13 each connected to the outer end of one of a pair of crank arms 14 the inner ends of which are secured to inner end portions of a pair of rockshafts 15 that are suitably journaled in the upper ends of the mounting members 7 above the pivotal connections of the upper links 9. The rockshafts 15 are disposed in upwardly spaced generally parallel relation to the tool bar 6. A plurality of elevator links 16 are pivotally connected each to the lower link 10 associated with a different one of the cultivator assemblies 5, as indicated at 17 in FIG. 2, and are formed at their upper ends to provide heads 18. A plurality of elevator arms 19 are rigidly secured at one end to the rockshaft 15 and have outer end portions 20 that loosely encompass adjacent ones of the elevator links 16. Rotary movement of the rockshafts 15 in one direction, imparted thereto by the cylinders 11, piston rods 13 and crank arms 14, moves the elevator arms 19 into engagement of the offset portions 20 thereof with the lifting link heads 18, to raise the cultivator sections 5 out of operative engagement with the ground. Fluid for operating the cylinders 11 is applied from a suitable source, not shown, usually found on tractors with hydraulic equipment.

Figure 7:
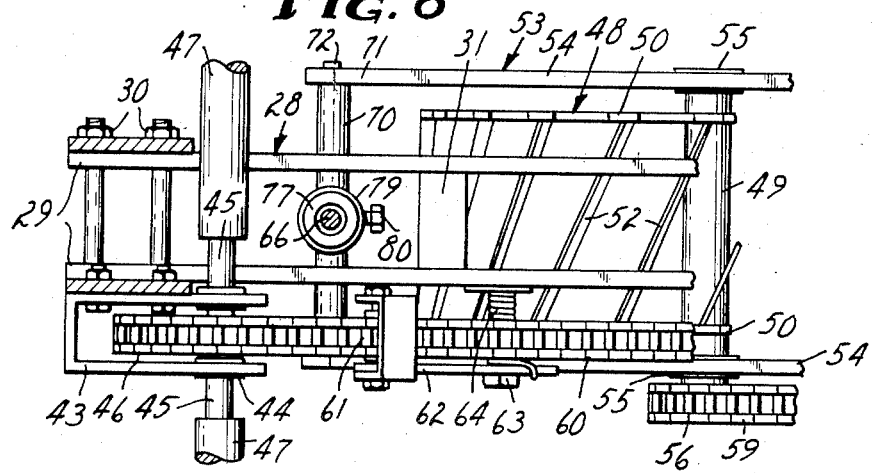
FIG. 7 is an enlarged fragmentary view, partly in top plan and partly in section, taken on the line 7—7 of FIG. 3.

The device of this invention involves frame structure 21, including an inverted generally U-shaped main body portion 22 having a flat horizontally disposed portion 23 and laterally spaced downwardly extending inverted L-shaped wings 24, portions of which are notched to receive spaced portions of a generally horizontal cross-sectionally rectangular tool bar 25. The main body 22 is releasably but rigidly anchored to the tool bar 25 by a U-shaped clamping bracket 26 and a pair of nut-equipped clamping bolts 27. The frame structure 21 further includes a bifurcated frame member 28 comprising spaced frame bars 29 having rear ends that are bolted to the lower ends of the wings 24, as indicated at 30. One or more spacer bars 31, one of which is shown in FIG. 7, are welded or otherwise rigidly secured to the bars 29. The frame member 28 extends generally forwardly and downwardly relative to the frame section 22 and, at its front end, carries a shaft 32, the purpose of which will hereinafter become apparent.

The mounting means for the frame structure 21 includes the tool bar 25 and a pair of laterally spaced mounting arms 33 that are bolted to opposite sides of the tractor frame 2 and which project forwardly therefrom, notched mounting plates 34 at the front ends of the mounting arms 33, a pair of notched clamping brackets 35, and nut-equipped clamping bolts 36 operatively engaging the plates 34 and clamping brackets 35 to securely hold the tool bar 25 therebetween. The mounting arms or bars 33 support the tool bar 25 in a horizontal position, the tool bar 25 extending transversely of the direction of movement of the tractor 1.

The tool bar 25 not only supports the frame structure 21, but also supports a plurality of laterally spaced dispensers or applicators 37 used to apply granular material such as fertilizer or pesticide chemicals to the ground in or adjacent the path of travel of the cultivator assemblies 5. The applicators 37 are generally of the type disclosed in my prior U.S. Letters Patent Nos. 2,852,116, 2,990,186 and 3,096,004, and include dispensing hoppers 38, feeding or metering rotors, not shown, within the hoppers 38 and terminating in shafts 39 projecting outwardly of the hoppers 38, delivery tubes 40 extending downwardly from the hoppers 38 and means including support rods 41 for supporting the tubes 40 and tubular delivery heads 42 connected to the lower ends of the tubes 40. The frame structure 21 includes a generally U-shaped bracket 43 having a pair of alligned bearings 44 that journal a drive shaft 45 having mounted thereon a sprocket wheel 46 within the bracket 43. The drive shaft 45 and dispenser shafts 39 are disposed in axial alignment, and are inter-connected by tubular coupling elements 47, whereby the rotor shafts 39 are driven from the drive shaft 45.

Means for imparting rotary movement to the drive shaft 45 includes a ground-engaging drive wheel 48 comprising a central shaft 49 disposed on a horizontal axis generally parallel to the drive shaft 45 and shaft 32, axially spaced rim flanges 50, spokes 51 connecting the rim flanges 50 to the shaft 49, and circumferentially spaced ground-engaging blades 52 welded or otherwise rigidly secured at their opposite ends to the rim flanges 50. Means for supporting the drive wheel 48 comprises a bifurcated leg 53 including a pair of laterally spaced leg members 54 that extend generally rearwardly and downwardly from the shaft 32, the front ends of the leg members 54 being pivotally mounted on the shaft 32. The wheel shaft 49 is suitably journaled in bearings 55 secured to the leg members 54 rearwardly of the shaft 32, to dispose the drive wheel 48 in trailing relationship to the shaft 32.

Means for imparting rotation to the drive shaft 45 from the drive wheel 48 comprises a sprocket wheel 56 mounted fast on the drive wheel shaft 49, a pair of sprocket wheels 57 and 58 joined together on the shaft 32 for common rotation, the sprocket wheel 46 on the drive shaft 45, an endless link chain 59 entrained over the sprocket wheels 56 and 57, and a second endless link chain 60 entrained over the sprocket wheels 46 and 58. An idler roller 61 is journalled in a bracket 62 that is pivotally mounted on one of the frame bars 29 by a pivot bolt or the like 63. A torsion spring 64, encompassing the bolt 63, yieldingly urges the bracket 62 and roller 61 toward engagement with the link chain 60 to maintain the chain 60 under predetermined driving tension.

Figure 6:
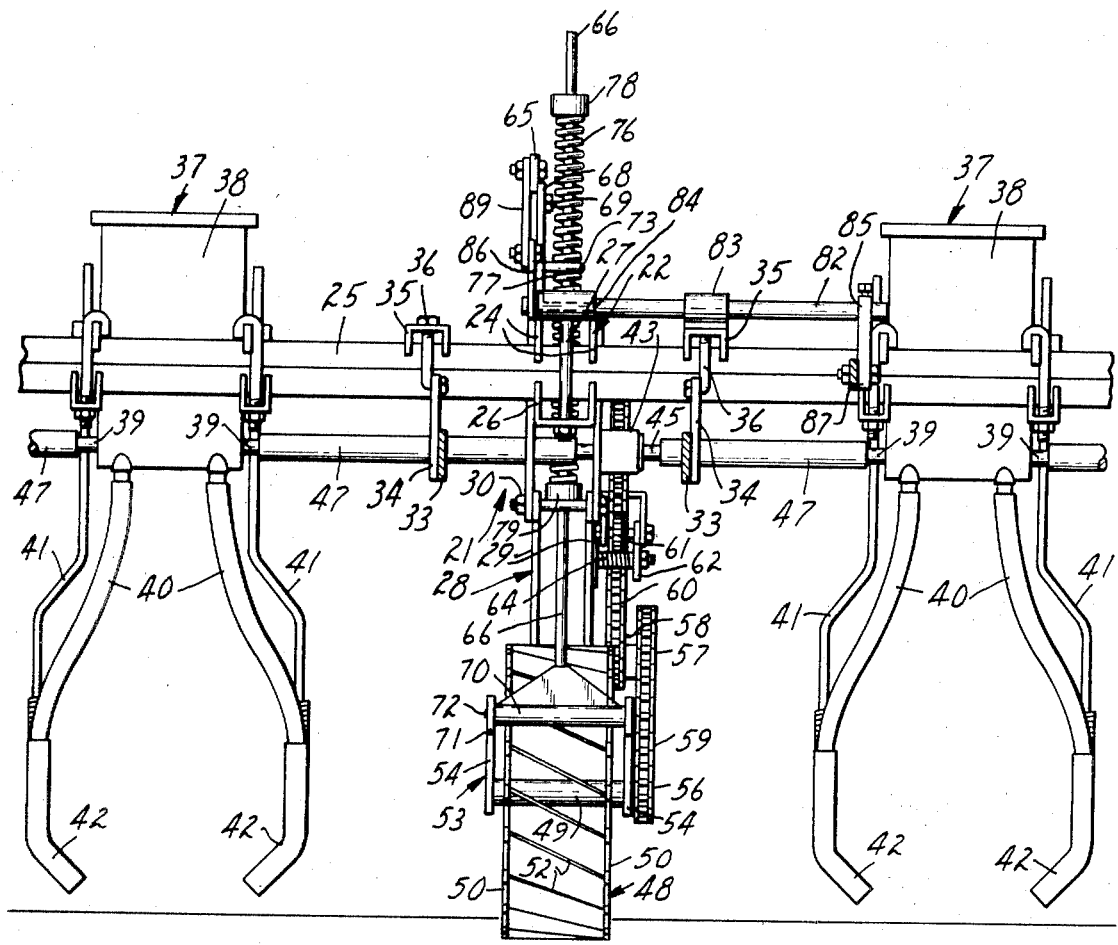
FIG. 6 is an enlarged view, partly in rear elevation and partly in section, taken substantially on the line 6—6 of FIG. 2.

Means for moving the drive wheel 48 selectively into and out of driving engagement with the ground to engerize or deenergize the feeding rotors of the applicators 37, comprises a lifting lever 65, an elongated lifting rod 66, and a resilient lost motion connection, indicated generally at 67, between the lever 65 and lifting rod 66. The lever 65 is pivotally mounted intermediate its ends to an upstanding bracket 68, as indicated at 69, the bracket 68 being bolted to the top portion 23 of the main frame structure body 22. The lifting rod 66 extends generally in a vertical direction, and has its lower end rigidly secured to a cross head 70 that is pivotally connected to angularly offset rear end portions 71 of the bifurcated leg 53, as indicated at 72. The lost motion connection 67 comprises a commercially available eye bolt 73 having a shank 74 that is pivotally mounted in an opening 75 in the front end portion of the lever 65, the eyebolt 73 encompassing the lifting rod 66; and a pair of upper and lower compression springs 76 and 77 respectively encompassing the lifting rod 66. As shown in FIGS. 2, 3 and 6, the springs 76 and 77 are interposed between opposite sides of the eye bolt 73 and a pair of stop collars 78 and 79 respectively, vertically adjustably mounted on the lifting rod 66 and releasably locked in desired set positions thereon, by set screws or the like 80. The spring 77 operates to maintain the drive wheel 48 in operative engagement with the ground, when the lever 65 is moved to its position of FIG. 2, and permits the drive wheel 48 to partake of raising and lowering movements about the axis of the shaft 32 and independently of the lever 65, whereby the drive wheel 48 follows rough or uneven terrain. The upper spring 76 operates as a cushion against action of the spring 77, and yieldingly supports the leg 53 and drive wheel 48 when the same are moved to their inoperative positions above ground level, as shown in FIG. 3.

While any suitable means may be used for moving the lever 65 between its drive wheel raised and lowered positions, for the purpose of the present example, I provide linkage operatively connecting the lever 65 to one of the fluid pressure operated cylinders 11, so that the drive wheel 48 may be raised and lowered simultaneously with the raising and lowering of the cultivator assemblies 5. As shown, the linkage comprises a bellcrank 81 having an elongated shaft 82 journalled in a bearing bracket 83 mounted on one of the clamping brackets 35 and a second bearing bracket 84 mounted on the top portion 23 of the frame body 22, and a pair of crank arms 85 and 86 rigidly secured at their inner ends to opposite end portions of the shaft 82. The outer end of the crank arm 85 is pivotally connected to one end of an elongated rigid link 87, the outer end of which is pivotally connected to the outer end of a crank arm 88 clamped or otherwise rigidly secured to one of the rockshafts 15, see FIGS. 1–3. The crank arm 86 is pivotally connected at its outer end to a rigid link 89, the other end of which is pivotally connected to the rear end portion 90 of the lifting lever 65. With this arrangement, when the cylinders 11 are energized to raise the cultivator assemblies 5, rotation of the rockshafts 15 in a clockwise direction with respect to FIGS. 2 and 3 imparts rotary or pivotal movement to the bellcrank 81 and lever 65 in a counterclockwise direction with respect to FIGS. 2 and 3 to raise the drive wheel 48 out of driving engagement with the ground. Conversely, when the cylinders 11 are energized to lower their respective cultivator assemblies 5 into operative engagement with the ground, the bellcrank 81 and lever 65 are swung in the opposite direction to lower the drive wheel 48 to operative engagement with the ground simultaneously with the cultivator assemblies 5.

A generally U-shaped guard or shield 91 partially surrounds the front end portion of the bifurcated frame member 28, leg 53 and drive wheel 48, and comprises a pair of guard sections 92 and 93 which, at their front ends, are bolted together and to a bracket 94 that is welded or otherwise rigidly secured to a tubular spacer 95 encompassing the shaft 32 between the front ends of the leg members 54. At their rear ends, the guard sections 92 and 93 are rigidly secured to the rear end portions 71 of adjacent leg members 54 by bracket elements 96, whereby the shield or guard 91 partakes of common raising and lowering movements with the leg 53.

Figure 8:
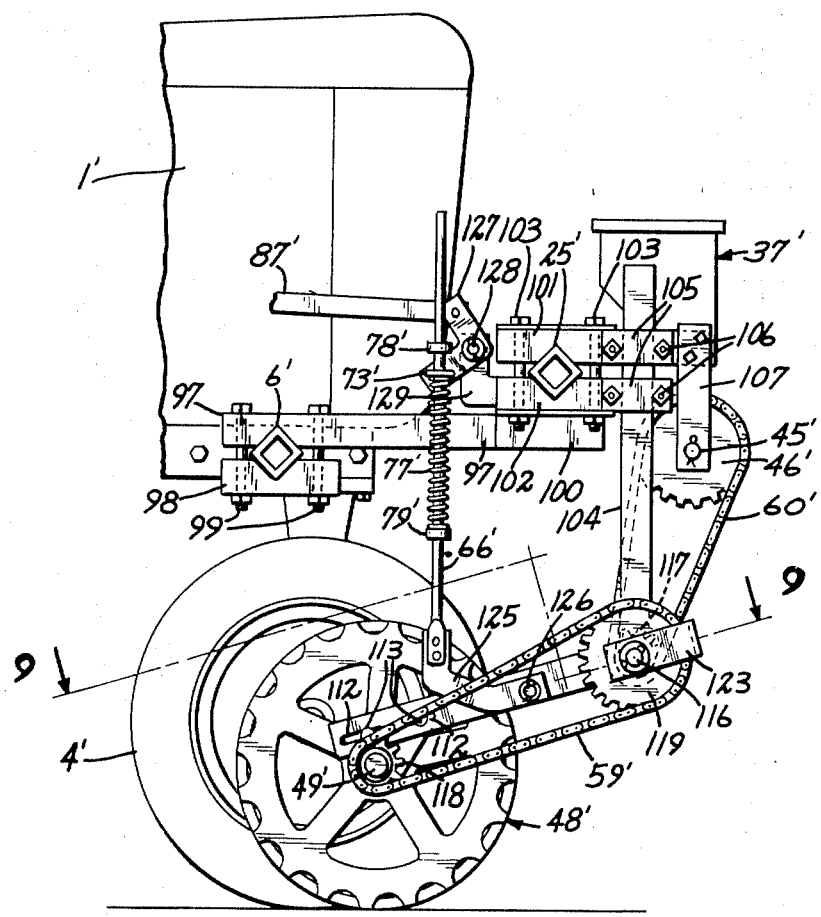
FIG. 8 is a view corresponding to FIG. 3, but showing a modified arrangement.
Figure 9:
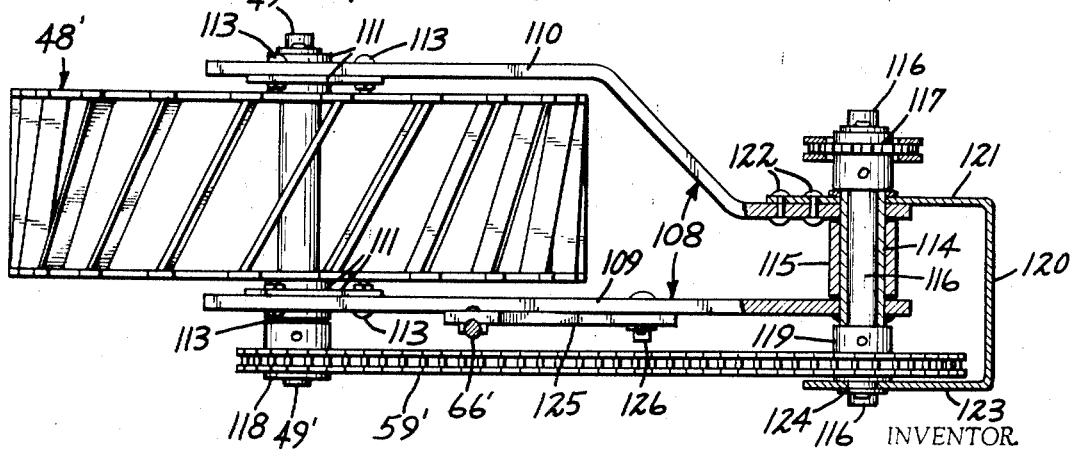
FIG. 9 is an enlarged fragmentary section taken substantially on the line 9—9 of FIG. 8.

In the modified form of the invention illustrated in FIGS. 8 and 9, those parts that are identical to corresponding parts in the structure illustrated in FIGS. 1–7 are indicated with like reference numerals with prime marks added. Thus, in FIG. 8, the tractor is indicated at 1', the front wheel or wheels at 4', and implement supporting tool bar at 6', and an applicator at 37'. In FIG. 8, the chemical delivery tubes and support rods therefor are omitted, the applicator supporting tool bar being indicated at 25' and drive wheel at 48'.

The tool bar 25' is supported by a plurality of support arms 97, one of which is shown in FIG. 8, the same being mounted on the tool bar 6' by clamping members 98 and nut-equipped clamping screws 99. The tool bar 25' is mounted on the front end portions of the support arms 97 by upstanding mounting plates 100, one of which is shown in FIG. 8, and clamping members and nut-equipped clamping screws, not shown, but which may be assumed to be similar to the clamping members 98 and nut-equipped clamping screws 99. The clamping plates 100 are rigidly secured such as by welding, to the front ends of their respective support arms 97. A pair of upper and lower notched support bars 101 and 102 respectively are rigidly secured to the tool bar 25' by nut equipped screws 103 and project forwardly from the tool bar 25' to support a generally vertical, cross sectionally tubular, column 104, by means of clamping plates 105 and nut-equipped clamping bolts 106, whereby the column 104 may be raised or lowered relative to the tool bar 25' and securely locked in desired vertically adjusted positions. The drive shaft 45' for the applicators 37' is journalled in the lower end portion of one or more bearing brackets 107 that are rigidly secured to and depend from the front end portions of the upper support bars 101. As shown in FIG. 8, an endless link chain 60' is entrained over the sprocket wheel 46' mounted on the drive shaft 45'.

The drive wheel supporting leg 108 comprises a pair of laterally spaced leg sections 109 and 110 that extend generally rearwardly from the lower end of the column 104, straddling the drive wheel 48'. At their rear end portions, the leg sections 109 and 110 are provided with bearings 111 that journal the drive wheel shaft 49', the leg sections 109 and 110 being provided with longitudinal slots 112 for reception of bearing mounting screws 113, and by means of which the bearings 111 may be adjustably movable longitudinally of the leg 108. At its front end portion, the leg section 109 is welded or otherwise rigidly secured to one end portion of a tubular sleeve 114 that extends transversely of the leg 108, the front end portion of the leg section 110 being journalled on the opposite end portion of the sleeve 114. The sleeve 114 is journalled in a tubular bearing 115 that is welded or otherwise rigidly secured to the lower end of the column 104, the front end portions of the leg sections 109 and 110 being disposed at opposite ends of the bearing 115, see FIG. 9. A shaft 116 is journalled in the tubular sleeve 114 and extends axially outwardly from the opposite ends thereof. The chain 60' is entrained over a sprocket wheel 117 that is pinned or otherwise rigidly secured to one end portion of the shaft 116, and an endless link chain 59' is entrained over a sprocket wheel 118 rigidly mounted on one end of the drive wheel shaft 49' and a cooperating sprocket wheel 119 rigidly mounted on the opposite end of the shaft 116. A generally U-shaped bracket member 120 has one leg 121 bolted or riveted to the front end portion of the leg section 110, as indicated at 122, and an opposite leg 123 having a transverse opening 124 for reception of the adjacent end of the shaft 116. The bracket 120 provides means for mounting a shield, not shown, but which may be assumed to be similar to the shield 91.

A lifting rod 66' is provided at its lower end with a generally forwardly projecting bar 125 that is pivotally secured to the leg section 109, as indicated at 126. The lifting rod 66' extends upwardly through an eyebolt 73' mounted on one arm of a bellcrank 127 that is pivotally mounted at its intermediate portion, as indicated at 128 to an upstanding bracket 129 welded or otherwise rigidly secured to one of the support bars 102. A pair of collars 78' and 79' are mounted on the lifting rod 66 above and below the eyebolt 73', and a coil compression spring 77' is disposed on the lifting rod 66' between the eyebolt 73' and lower collar 79'. The other arm of the bellcrank 127 is pivotally secured to the front end of a rigid link 87'. The opposite end of the link 87' may be assumed to be connected to the implement elevating mechanism shown in FIGS. 1–3, including the rockshaft 15.

When the link 87' is moved forwardly in an implement raising direction, the bellcrank 127 is pivotally moved in a direction to cause the eyebolt 73' to engage the upper collar 78' to raise the lifting rod 66', imparting lifting movement to the leg 108 and drive wheel 48' out of engagement with the ground. Conversely, rearward movement of the link 87' in an implement lowering direction, imparts swinging movement to the bellcrank 127 in a diretcion to permit lowering of the drive wheel 48' into engagement with the ground, the eyebolt 73' moving out of engagement with the upper collar 78' and compressing the spring 77' to maintain the drive wheel 48' in engagement with the ground during travel of the drive wheel 48' over rough and uneven terrain.

While I have shown and described the drive mechanism of this invention as being mounted forwardly of the tractor 1, it will be appreciated that the same may be mounted at either side of the tractor or at the rear thereof, depending upon the desired placement of the equipment, such as the dispensers or applicators 37 to be driven thereby.

What is claimed is:

1. Rotary drive mechanism for agricultural implements, comprising:
    (a) a frame structure,
    (b) frame mounting means for mounting said frame structure on a prime mover,
    (c) a ground-engaging drive wheel,
    (d) wheel-mounting means journaling said drive wheel in said frame structure for rotation on a generally horizontal axis and for generally vertical bodily movements toward and away from engagement with the ground,
    (e) a rotary drive shaft journaled in said frame structure,
    (f) drive connections between said drive wheel and drive shaft for imparting rotation to said drive shaft responsive to enagegement of said wheel with the ground and movement of said prime mover, when said frame is mounted thereon,
    (g) and lifting means including a movable element and a resilient lost motion connection between said movable element and wheel mounting means for imparting raising and lowering movements to said drive wheel.

2. The rotary drive mechanism defined in claim 1, in which said frame mounting means comprises an elongated rigid tool bar and a pair of mounting arms rigidly connected at longitudinally spaced points to said tool bar and arranged to be secured to the prime mover to support said tool bar in a horizontal position extending transversely of the direction of travel of the prime mover, said frame structure being rigidly mounted on said tool bar.

3. The rotary drive mechanism defined in claim 2, in which said frame structure comprises a main body portion on the tool bar and an elongated frame member extending angularly forwardly and downwardly from said body portion, said wheel mounting means comprising a leg having a front end pivotally mounted to the front end of said frame member and extending angularly rearwardly and downwardly from said front end of the frame member, said drive wheel being journalled in said leg rearwardly of the front end of the leg.

4. The rotary drive mechanism defined in claim 1, in which said wheel mounting means comprises a leg having one end pivotally mounted to said frame structure on an axis parallel to the axis of said drive wheel, said drive wheel being journaled on said leg in longitudinally spaced relation to said one end, said lifting means including a lifting member connected to said leg in longitudinally spaced relation to said one end of the leg.

5. The rotary drive mechanism defined in claim 4, in which said frame structure includes an elongated rigid frame member projecting in a generally forward direction when mounted on said prime mover, said leg being pivotally connected to the front end of said frame member and extending generally rearwardly from said front end, whereby the drive wheel is disposed in trailing relationship to the pivotal connection of said leg to the frame member.

6. The rotary drive mechanism defined in claim 4, in which said drive connections comprise:
   (a) a sprocket wheel rigidly mounted on said drive shaft for common rotation therewith,
   (b) a drive sprocket wheel operatively connected to said drive wheel,
   (c) a pair of connected sprocket wheels journaled on the axis of pivotal connection of said leg to the frame structure,
   (d) a first endless link chain entrained over the drive wheel mounted sprocket wheel and one of the sprocket wheels of said pair thereof,
   (e) and a second endless link chain entrained over said shaft mounted sprocket wheel and the other sprocket wheel of said pair thereof.

7. The rotary drive mechanism defined in claim 1, in which said movable element comprises a lever, said lifting means including an elongated lifting rod connected to said wheel mounting means and extending upwardly therefrom, said resilient lost motion connection comprising a connector element mounted on one of said lever and lifting rod and movable relative to the other of said lever and lifting rod, and a spring interposed between said connector element and said other of the lever and lifting rod.

8. The rotary drive mechanism defined in claim 7, in which said connector element is formed to provide an opening for slidable reception of said lifting rod, said connector element being pivotally connected to said lever on an axis normal to the axis of said lifting rod, said spring being a coiled compression spring encompassing said lifting rod and having an inner end engaging said connector element, characterized by a stop member on said lifting rod, said spring having an outer end abutting said stop member.

9. The rotary drive mechanism defined in claim 8, in which said stop member comprises a stop collar axially slidably encompassing said lifting rod, characterized by means for releasably locking said stop collar in desired set positions axially of said lifting rod to vary the yielding bias of said spring against said connector element.

10. The rotary drive mechanism defined in claim 1, in which said lifting means includes a rigid link operatively connected to said lever and having means for connection to power operated mechanism of said prime mover for imparting drive wheel lifting and lowering movements to said lever.

11. The rotary drive mechanism defined in claim 1 in which said frame structure includes a generally vertically disposed column having a lower end in upwardly spaced relation to the ground, said wheel mounting means comprising a leg having a front end pivotally mounted to the lower end of said column and extending generally rearwardly of said column, said drive wheel being journalled to the rear end portion of said leg.

12. The rotary drive mechanism defined in claim 11 in which said movable element is generally vertically movable, said lifting means further comprising a generally vertical lifting link having a lower end pivotally connected to said leg and vertically slidably engaging said generally vertically movable element, a stop member on said link engaging said vertically movable element to limit downward movement of said link relative to said vertically movable element, and yielding means operatively engaging said link and vertically movable element and urging said link, leg and drive wheel in a downward direction relative to said generally vertically movable element.

References Cited

UNITED STATES PATENTS

| | | | |
|---|---|---|---|
| 2,692,506 | 10/1954 | Hill | 74—13 |
| 2,795,919 | 6/1957 | Paul | 74—13 X |
| 3,126,748 | 3/1964 | Mostrong | 74—13 |

LEONARD H. GERIN, Primary Examiner